United States Patent

Mann

[11] Patent Number: 5,832,622
[45] Date of Patent: Nov. 10, 1998

[54] DIRECT READING INSIDE AND OUTSIDE TAPE MEASURE

[76] Inventor: Harold J. Mann, 415 Post Rd. Dr., Austin, Tex. 78704

[21] Appl. No.: 641,540

[22] Filed: May 1, 1996

[51] Int. Cl.⁶ .................................................. G01B 3/10
[52] U.S. Cl. ................... 33/766; 33/765; 33/769
[58] Field of Search ............................. 33/765, 769, 766, 33/761

[56] References Cited

U.S. PATENT DOCUMENTS

| | | | |
|---|---|---|---|
| 1,434,528 | 11/1922 | Crogan . | |
| 2,131,695 | 9/1938 | Stowell | 33/138 |
| 2,207,277 | 7/1940 | Volz | 33/769 |
| 2,695,454 | 11/1954 | Dart | 33/138 |
| 3,255,531 | 6/1966 | Anderson | 33/138 |
| 3,375,590 | 4/1968 | Quenot | 33/765 |
| 3,494,038 | 2/1970 | Quenot | 33/769 |
| 3,534,478 | 10/1970 | Fisher | 33/765 |
| 4,578,867 | 4/1986 | Czerwinski et al. | 33/765 |
| 5,383,285 | 1/1995 | Takahashi | 33/756 |

FOREIGN PATENT DOCUMENTS

| | | | |
|---|---|---|---|
| 1241202 | 8/1960 | France | 33/761 |
| 88541 | 2/1967 | France | 33/766 |
| 60-218001 | 10/1985 | Japan | 33/765 |
| 62-284201 | 12/1987 | Japan | 33/765 |

*Primary Examiner*—Thomas B. Will
*Attorney, Agent, or Firm*—William S. Ramsey

[57] ABSTRACT

An improved measuring tape which allows both inside and outside dimensions to be read directly from the same printed face of the tape. The tape measure comprises a case having a tape coiled inside the case and extending out of the case through a slot in the case. Inside the case is a guide wheel which guides the tape along a bottom wall of the case. The front wall of the case is transparent so that the graduations on the tape can be seen adjacent to the bottom wall. A pointer on the case points to the graduations such that when the tape is fully retracted, the pointer points to a measurement corresponding to the width if the case. This enables the case and the tape to be used to make inside measurements.

6 Claims, 1 Drawing Sheet

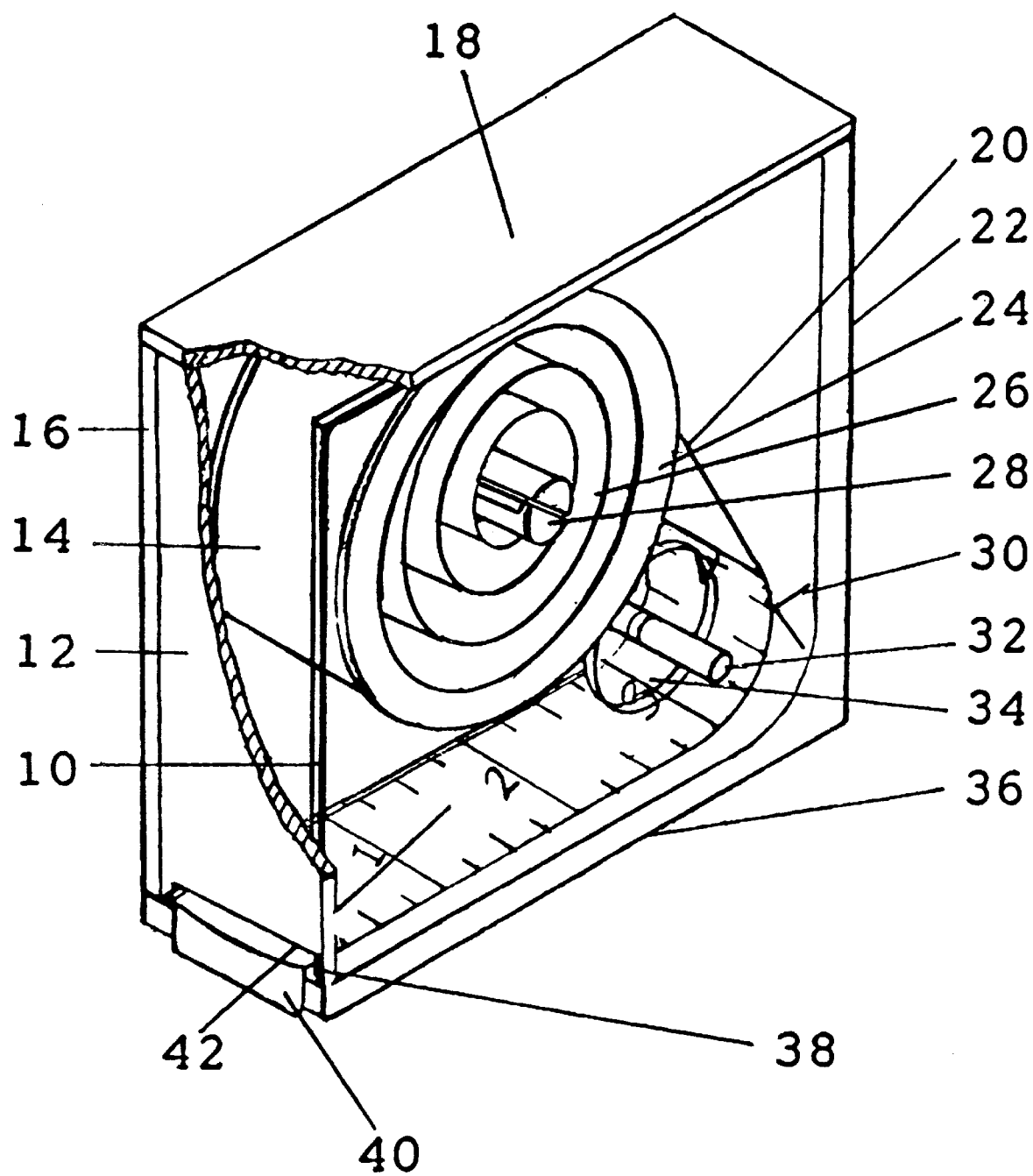

DIRECT READING INSIDE AND OUTSIDE TAPE MEASURE

BACKGROUND OF THE INVENTION

1. Field of Invention

This invention relates to spring-loaded coil in case tape measures, specifically to those providing inside as well as outside dimensions.

2. Description of the Prior Art

Carpenters and workers have had a long-standing need for a better tape measure which can measure inside as well as outside dimensions. The need is for one that will directly read the space between two facing walls as well as the dimension outside walls, which is two wall thickness'greater. This is discussed in U.S. Pat. No. 2,131,695 which was issued to A. L. Stowell in 1939. Stowell lists the inside measuring feature as a first aim. This tape is manually pressed into a storage ring, building the coil toward the center. For this reason it becomes unwieldly at lengths above three meters.

Likewise, in 1952, William F. Dart proposed an easily read tape for both inside and outside dimensions in his U.S. Pat. No. 2,695,454. Darts tape is read at recessed pointers near the tape outlet. It is not really direct reading since the user must mentally add the case width to the pointer reading to arrive at inside dimensions. In 1966 A. N. Anderson received U.S. Pat. 3,255,531. This device is truly direct reading. It reads the convex face of the tape through a viewing window on top of the case for inside dimensions. One drawback is that both sides of the tape must be printed with graduations, adding an increment of cost. Also this design required complex means to control the developed length of the tape as it travels to the top viewing window.

SUMMARY OF THE INVENTION

In my tape measure the read point for inside dimensions is inside the case at the lower right hand corner. A mark on a wall of the case is read through a transparent front wall. The coil of tape on the reel is raised slightly and the path of tape being withdrawn in caused to arc around a detour wheel. This makes possible the easy reading of tape graduations now clearly visible through the case front.

Accordingly, several objects and advantages of the invention are to provide an improved inside and outside tape measure, to provide a more affordable design which has minimal added structure. In my design there is no need to print the reverse side of the tape. No mental arithmetic is required to know accurate inside dimensions. My improvement makes easy the reading of the smallest increment of scale from a primary concave face of the tape. Further objects and advantages will become apparent from the ensuing description and drawings.

BRIEF DESCRIPTION OF THE DRAWING

FIG. 1 shows a perspective cutaway view of a tape measure according to my invention.

DESCRIPTION OF THE PREFERRED EMBODIMENTS

My tape measure, FIG. 1, comprises a case which consist of a generally rectangular back wall 16, a matching-size transparent front wall 10, a left side wall 12, a right side wall 22, a top 18, and bottom 36. These six planar surfaces from a rectangular prism which encases this hand-held measuring tool. The convenient size should not exceed 10 cm in height and width nor more than about 4 cm in thickness. Transparent front wall 10 of the case is preferably of 2 mm thick, clear polycarbonate sheet. The rest of the case is formed of aluminum with a wall thickness of 3 mm.

The case is somewhat taller than previous designs, allowing space for new features. Left side wall 12 has an outlet 38, near case bottom 36. This outlet is 2 cm by 5 mm allowing passage for a graduated tape 20 to extend and retract. Tape 20, the essence of the tool, is of high carbon steel six meters in length, with a width of 2 cm. The tape is printed with graduations on one face starting from 90 degree flanged hook 40, which is slidably attached to an end of the tape. The opposite end is secured to the outside surface of reel 24. Reel 24 is of molded polypropylene, 5 cm in diameter with a hole bore of 6 mm. When not in use tape 20 is wound tightly around reel 24 inside the case to form a coil 14. (The tape coil on a reel is conventional at present.)

A spindle 28 protrudes into the case as an integral part of back wall 16 and perpendicular to it. Spindle 28 is 7 mm in diameter and extends 3 cm out from the back wall. The spindle has a central slot which is 1 mm wide and which extends from it's outer end 2 cm back toward back wall 16. Reel 24 pivots on the spindle. The spindle slot clamps on an end of a clock-type spring 26. This spring is mounted between the spindle and the inner wall of the reel. A section 42 of tape 20 extends from coil 14 through tape outlet 38. Hook 40 is pulled against this outlet by spring 26 when tape 20 is retracted.

Several important new features are visible through the transparent front wall. In the preferred embodiment, a wheel 34 of clear acrylic material 3 cm in diameter is fixed on a shaft 32, which extends between the case walls from front to back. Shaft 32 is 3 mm in diameter located so that when turning the wheel forces tape 20 toward right side wall 22 leaving only minimum clearance of 2 mm. Wheel 34 is in rolling contact with the concave face of the tape. Spring 26 maintains a slight tension on the tape so that it holds a constant arc around the wheel. Each small graduation on the tape edge traveling on this arc passes a point near wall 22 equal to the width of the case. At this exact point a marker 30 is attached to the case on right wall 22 near the bottom. If it is desired to print graduations of an alternative system on the back wall edge of the tape opposite marker 30, another marker may be placed 90 degrees across the tape.

To use tape measure, the user pulls hook 40 withdrawing tape 20 from its coiled condition on coil 14. This turns reel 24, generating retracting power by winding clock-type spring 26 tighter. The reel pivots on spindle 28. The tape extends from the coil outward past marker 30 and wheel 34 in route to outlet 38.

In an important feature of operation, wheel 34 causes the tape to detour away from a direct straight-line path from the coil to the tape outlet. This detour path creates a viewing gap so that marker 30 can be easily seen through the transparent front wall. Marker 30 is aligned with the tape graduation mark equal to the known width of the case. In the present example, it can be seen that marker 30 points to a measurement of 3⅜ inches, the width of the case. This demonstrates that the device provides inside dimensions. The user reads an inside dimension from marker 30 when hook 40 is pressed against a leftward object and right wall 22 is pressed against a rightward object.

From the above it is apparent that my tape measure is a more convenient, accurate, and timesaving way of dimensioning in the workplace. This improvement makes unnecessary the double printing of some previous tapes. It also avoids many mistakes caused by the tedious need to mentally add two fractional numbers together. These mistakes result in the waste of material and time.

While the above description is concrete in tone, it should not be seen as limiting the scope of the invention. New material developments may suggest detail changes. Instead of one wheel to guide the tape, a plurality of smaller wheels, (not shown) or slides can be used. A series of magnetized rollers can be placed beneath the tape to assist guidance. The back wall may also be made transparent so that the device is readable from either side. Reflective surfaces inside the case as well as mirrors and magnifiers can be used under conditions of poor lighting. The materials and dimensions indicated can be changed, e.g., the case can be made of all plastic instead of part aluminum. Accordingly, the scope of the invention should be determined not by the embodiment illustrated, but by the appended claims and their legal equivalents.

I claim:

1. In a tape measure comprising a case with a reel of tape pivoted on a spindle within said case, said case having a tape outlet said tape being printed on one side with graduations and coilable and decoilable through said tape outlet, an improvement characterized in that said case has:

(a) a wall of transparent material, (b) guiding means of clear material for guiding said tape so that said graduations can be read through said transparent wall and, (c) indicating means attached to said case so that said graduations will move past said indicating means as said tape is pulled out of said case outlet.

2. The tape measure of claim 1 wherein said guiding means is a wheel of clear material mounted in said case, said wheel being rotatable mounted on a pivot axle spaced from said spindle.

3. The tape measure of claim 1 wherein said case is rectangular and has two parallel major walls, one of which is said transparent wall.

4. The tape measure of claim 3 wherein said guiding means is a wheel of clear material mounted in said case, said wheel being rotatably mounted on a pivot axle spaced from said spindle.

5. The tape measure of claim 4 wherein said wheel is spaced from said spindle in a direction opposite from said tape outlet so that said tape is guided in a path which turns away from a straight-line path to said outlet and is guided into close proximity with a facing wall which is opposite a wall where said outlet is located.

6. The tape measure of claim 5 wherein said indicating means is attached to the facing wall which is in opposed relation to the wall where said outlet is located.

\* \* \* \* \*